United States Patent
Ganesan et al.

(10) Patent No.: US 11,352,483 B2
(45) Date of Patent: Jun. 7, 2022

(54) RUBBER COMPOSITION FOR TYRES WITH GOOD WET GRIP AND WINTER PROPERTIES BY TAILORING PHASE MORPHOLOGY

(71) Applicant: Apollo Tyres Global R&D B. V., Enschede (NL)

(72) Inventors: Swarupini Ganesan, Tilberg (NL); Sander Marinus, Enschede (NL); Mohamed Tharik, Enschede (NL); Hendrik Stevens, Hannover (DE); Louis Reuvekamp, Enschede (NL)

(73) Assignee: Apollo Tyres Global R&D B. V., Enschede (NL)

( * ) Notice: Subject to any disclaimer, the term of this patent is extended or adjusted under 35 U.S.C. 154(b) by 281 days.

(21) Appl. No.: 16/489,886

(22) PCT Filed: Mar. 2, 2018

(86) PCT No.: PCT/EP2018/055156
§ 371 (c)(1),
(2) Date: Aug. 29, 2019

(87) PCT Pub. No.: WO2018/158418
PCT Pub. Date: Sep. 7, 2018

(65) Prior Publication Data
US 2020/0048439 A1    Feb. 13, 2020

(30) Foreign Application Priority Data
Mar. 3, 2017   (GB) ..................... 1703451

(51) Int. Cl.
| | |
|---|---|
| *C08L 9/06* | (2006.01) |
| *B60C 1/00* | (2006.01) |
| *C08K 5/01* | (2006.01) |
| *C08L 7/00* | (2006.01) |
| *C08L 55/00* | (2006.01) |

(52) U.S. Cl.
CPC .............. *C08L 9/06* (2013.01); *B60C 1/0016* (2013.01); *C08K 5/01* (2013.01); *C08L 7/00* (2013.01); *C08L 55/00* (2013.01); *C08L 2205/03* (2013.01); *C08L 2312/00* (2013.01)

(58) Field of Classification Search
CPC .... C08L 9/06; C08L 7/00; C08L 55/00; C08L 2205/03; C08L 2312/00; B60C 1/0016; C08K 5/01
USPC ........................................................ 523/156
See application file for complete search history.

(56) References Cited

U.S. PATENT DOCUMENTS

| | | | |
|---|---|---|---|
| 4,756,353 A | 7/1988 | Nordsiek et al. | |
| 5,104,941 A * | 4/1992 | Wolpers ................. | C08L 21/00 525/237 |
| 7,259,205 B1 | 8/2007 | Pagliarini et al. | |
| 2004/0122134 A1 | 6/2004 | Weydert et al. | |
| 2007/0037908 A1 | 2/2007 | Pille-Wolf | |
| 2011/0123746 A1 | 5/2011 | Mosinski et al. | |
| 2012/0077902 A1 | 3/2012 | Steiner et al. | |
| 2013/0153100 A1 * | 6/2013 | Piffard ................ | B60C 11/1392 152/209.1 |
| 2013/0331498 A1 | 12/2013 | Miyazaki | |
| 2014/0155542 A1 | 6/2014 | Kaszas | |
| 2015/0283854 A1 * | 10/2015 | Saintigny .................. | C08L 9/06 524/313 |
| 2015/0343843 A1 | 12/2015 | Cato et al. | |
| 2016/0090475 A1 * | 3/2016 | Nakatani ................... | C08L 9/06 524/526 |
| 2016/0168367 A1 | 6/2016 | Tahon et al. | |

FOREIGN PATENT DOCUMENTS

| | | |
|---|---|---|
| EP | 0806453 B1 | 3/2000 |
| JP | 4356544 B | 12/1992 |
| JP | 2009287020 A | 12/2009 |
| WO | 2008121139 A1 | 10/2008 |

OTHER PUBLICATIONS

PCT International Search Report and Written Opinion of the International Searching Authority for corresponding PCT Application No. PCT/EP2018/055156 dated May 16, 2018.
Search Report for corresponding Application No. GB1703451.3 dated Aug. 15, 2017.
PCT International Preliminary Report on Patentability for corresponding PCT Application No. PCT/EP2018/055156 dated Sep. 3, 2019.

* cited by examiner

*Primary Examiner* — Doris L Lee
(74) *Attorney, Agent, or Firm* — Renner, Otto, Boisselle & Sklar, LLP

(57) ABSTRACT

The present invention relates to a cross-linkable rubber composition, a cross-linked rubber composition obtained by cross-linking such a rubber composition, a method of preparing a tyre and a tyre. In a cross-linkable rubber composition the cross-linkable rubber composition comprises, per hundred parts by weight of rubber (phr): ≥1 phr to ≤99 phr of a rubber component selected from the group of styrene-butadiene rubber (SBR), polybutadiene rubber (BR), natural rubber (NR) or a mixture thereof; and ≥1 phr to ≤120 phr of an aliphatic resin component. The composition further comprises ≥1 phr to ≤50 phr of a polyisoprene rubber (IR) having ≥mol-%, as determined by NMR spectroscopy, of 3,4-linked units derived from isoprene. It has surprisingly been found that such a polyisoprene rubber having 3,4-linked units derived from isoprene in combination with aliphatic resin worked very well in broadening the tan delta curve of the compound, indicating the compound can perform well in wide range of conditions when cured and used as a rubber for a tyre tread.

12 Claims, 1 Drawing Sheet

RUBBER COMPOSITION FOR TYRES WITH GOOD WET GRIP AND WINTER PROPERTIES BY TAILORING PHASE MORPHOLOGY

This application is a national phase entry of International Application No. PCT/EP2018/055156 filed on Mar. 2, 2018 and published in the English language, which claims priority to Application No. GB 1703451.3 filed on Mar. 3, 2017, both of which are hereby incorporated by reference.

The present invention relates to a cross-linkable rubber composition, a cross-linked rubber composition obtained by cross-linking such a rubber composition, a method of preparing a tyre and a tyre.

Tread rubber is one of the important portions of a pneumatic tyre which contributes enormously to the overall performance of a tyre. A tyre has to perform well in severe weather conditions and it has to exhibit a variety of performances such as wet grip, abrasion resistance and low rolling resistance. In addition, further requirements for all-season and winter tyres are required, such as retaining good performance on snow and ice.

A tread compound can be optimized to exhibit good winter performance by using low Tg polymers but it normally results in poor wet grip properties. On the other hand, tuning the rubber compound by using high Tg polymers or performance resins to improve wet grip properties possibly leads to impairment in winter performance and/or rolling resistance.

In order to obtain good winter tyres, all properties need to be improved simultaneously.

US 2015/343843 A1 discloses a tread for a tire, the tread comprising a rubber composition that is based upon a cross-linkable elastomer composition, the cross-linkable elastomer composition comprising, per hundred parts by weight of rubber (phr), a high-Tg rubber being a highly unsaturated diene elastomer having a glass transition temperature of between −30° C. and 0° C., a low-Tg rubber being a highly unsaturated diene elastomer having a glass transition temperature of between −110° C. and −60° C. The high-Tg and the low-Tg elastomers are incompatible and this reported to provide, among other advantages, improved snow traction of the tread when compared to tire treads having a lower Tg.

Optimizing the tread compound for wet grip normally results in trade-off in winter performance. The present invention has the object to provide a composition for a tyre tread which can serve well in wide range of temperatures and conditions—both winter and wet.

This object is achieved by a cross-linkable rubber composition, the cross-linkable rubber composition comprising, per hundred parts by weight of rubber (phr):
 ≥1 phr to ≤99 phr of a rubber component selected from the group of styrene-butadiene rubber (SBR), polybutadiene rubber (BR), natural rubber (NR) or a mixture thereof; and
 ≥1 phr to ≤120 phr of an aliphatic resin component;
 wherein the composition further comprises ≥1 phr to ≤50 phr of a polyisoprene rubber (IR) having ≥10 mol-%, as determined by NMR spectroscopy, of 3,4-linked units derived from isoprene.

It has surprisingly been found that such a polyisoprene rubber having 3,4-linked units derived from isoprene in combination with an aliphatic resin worked very well in broadening the tan delta curve of the cross-linked compound, indicating that the compound can perform well in a wide range of conditions and used as a rubber for a tyre tread (determined from DMA measurement according to ISO 4664-1).

Isoprene has a conjugated diene moiety, and its polymerisation can provide various isomeric polymers or units derived from isoprene within the polymer. This is depicted in the reaction scheme below, where isoprene (1) is polymerised to give cis-1,4-linked units (2), trans-1,4-linked units (3), 3,4-linked units (4) and 1,2-linked units (5).

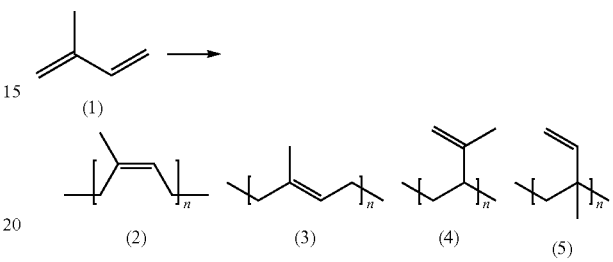

According to the invention, the composition further comprises ≥1 phr to ≤50 phr of a polyisoprene rubber (IR) having ≥10 mol-%, as determined by NMR (nuclear magnetic resonance) spectroscopy, of 3,4-linked units derived from isoprene. These units correspond to (4) in the reaction scheme. Their content, as expressed by the percentage of units (4) in relation to the sum of units (1) to (5), can be determined by integrating the appropriate signals in $^{13}$C and/or $^1$H-NMR spectra. Exemplary publications outlining the experimental procedures are: "Factors Affecting the Isomeric Chain Unit Structure in Organolithium Polymerization of Butadiene and Isoprene", Maurice Morton and J. R. Rupert, Initiation of Polymerization. Apr. 19, 1983, 283-289, DOI:10.1021/bk-1983-0212.ch021 and "On the structure of 3,4-/cis-1,4-polyisoprene by $^{13}$C n.m.r.", W. Gronski, N. Murayama, H.-J. Cantow and T. Miyamoto, Polymer, Volume 17, Issue 4, April 1976, Pages 358-360, DOI:10.1016/0032-3861(76)90199-3.

The polyisoprene rubber in the composition according to the invention may be a polyisoprene homopolymer or copolymer. In both instances, the mol-percentage of 3,4-linked units (4) is expressed by the percentage of units (4) in relation to the sum of units (1) to (5).

Preferably the polyisoprene rubber has ≥20 mol-%, more preferred ≥30 mol-%, even more preferred ≥40 mol-% and most preferred ≥50 mol-% of 3,4-linked units derived from isoprene. In particular, this content may be ≥50 mol-% to ≤95 mol-% or ≥55 mol-% to ≤90 mol-%.

According to the invention, the composition comprises ≥1 phr to ≤99 phr of a rubber component, selected from the group of styrene-butadiene rubber (SBR), polybutadiene rubber (BR), natural rubber (NR) or a mixture thereof. The SBR rubber component may contain one type of SBR rubber or several different types. Preferably, at least one type of SBR rubber is manufactured according to the solution process (SSBR or solution SBR). Likewise, the BR rubber component may contain one type of BR rubber or several different types.

It is further understood that in formulations discussed in connection with the present invention the phr amount of all rubber components adds up to 100.

The cross-linkable rubber composition according to the invention comprises cross-linkable groups in the individual rubber components. They may be cross-linked (cured, vulcanised) by methods known to a skilled person in the rubber technology field.

The aliphatic resins are resins without aromatic structure such as polyterpene resins, or aliphatic hydrocarbon resins such as C5 or DCPD (dicyclopentadiene) resins. The aliphatic resin component may be one of these resins or a combination thereof.

The polyterpene resin is a resin obtained by polymerizing a terpene compound, or a hydrogenated product of the resin. The terpene compound is a hydrocarbon represented by $(C_5H_8)$, or an oxygenous derivative thereof, whose basic structure is any of terpenes classified into monoterpenes $(C_{10}H_{16})$, sesquiterpenes $(C_{15}H_{24})$, diterpenes $(C_{20}H_{32})$, and the like. Examples of the compound include α-pinene, β-pinene, dipentene, limonene, myrcene, allo-ocimene, ocimene, α-phellandrene, α-terpinene, γ-terpinene, terpinolene, 1,8-cineole, 1,4-cineole, α-terpineol, β-terpineol, and γ-terpineol.

Examples of the polyterpene resins include terpene resins formed from the terpene compounds described above, such as α-pinene resin, β-pinene resin, limonene resin, dipentene resin, or β-pinene/limonene resin, as well as hydrogenated terpene resins prepared by hydrogenating any of the terpene resins. Preferably non-hydrogenated terpene resins are used, most preferably limonene resins are used.

Aliphatic hydrocarbon resins may contain aliphatic hydrocarbon components which have a hydrocarbon chain formed from C4-C6 fractions containing variable quantities of piperylene, isoprene, mono-olefins, and non-polymerizable paraffinic compounds. Such hydrocarbon resins are based on pentene, butene, isoprene, piperylene, and may contain reduced quantities of cyclopentadiene or dicyclopentadiene.

The cross-linkable rubber compositions may be sulfur-vulcanizable and/or peroxide-vulcanizable. Other vulcanization systems may also be used. If desired, additives can be added. Examples of usual additives are stabilizers, antioxidants, lubricants, fillers, dyes, pigments, flame retardants, conductive fibres and reinforcing fibres.

If desired, the cross-linkable rubber composition can also comprise a coupling agent. Suitable coupling agents comprise silane compounds. Particularly suitable silane compounds comprise di- and tetrasulphides and mercaptosilanes. It is possible for the rubber composition to be provided with a conductive filler to make it at least partially conductive.

Further embodiments and aspects of the present invention will now be described. They can be combined freely unless the context clearly indicates otherwise.

In an embodiment of the rubber composition according to the invention, the polyisoprene rubber has a glass transition temperature of ≥−15° C. to ≤−5° C., preferably ≥−12° C. to ≤−7° C. (measured by differential scanning calorimetry (DSC), according to ISO 22768).

Without being bound to theory, it is believed that a cross linked rubber composition according to the invention with a polyisoprene rubber with a relatively high Tg will contribute to the broadening of the tan delta curve towards 0° C. and hence an increase in wet properties.

In another embodiment of the rubber composition according to the invention the polyisoprene rubber has a Mooney viscosity (ML 1+4, ASTM D1646-15) of ≥60 to ≤75 M. U., preferably ≥65 to ≤70 M. U. Particularly preferred is a solution-polymerised 3,4 addition polyisoprene with a $T_g$ of ≥−15° C. to ≤−5° C., a 3,4-addition product content of ≥55 mol-% to ≤65 mol-% and a viscosity (ML 1+4) of ≥60 to ≤75 M. U.

In another embodiment of the rubber composition according to the invention the composition comprises, per hundred parts by weight of rubber, ≥5 phr to ≤40 phr of the polyisoprene rubber, more preferably ≥10 phr to ≤30 phr.

In another embodiment of the rubber composition according to the invention the composition comprises, per hundred parts by weight of rubber (phr), ≥5 phr to ≤60 phr, preferably ≥10 phr to ≤30 phr, most preferred ≥15 phr to ≤25 phr, of the aliphatic resin component.

In another embodiment of the rubber composition according to the invention, ≥70 phr of the rubbers have a glass transition temperature Tg of ≥−120° C. to ≤−50° C., preferably ≥−110° C. to ≤−60° C. as determined by DSC according to ISO 22768.

Without being bound to theory, it is believed that a rubber composition according to the invention with a high amount of rubber components with a low Tg will shift the tan delta curve towards lower temperatures and hence will lead to an increase in winter properties.

In another embodiment of the rubber composition according to the invention the composition comprises:
- ≥45 phr to ≤65 phr, preferably ≥50 phr to ≤60 phr, of styrene-butadiene rubber (SBR);
- ≥15 phr to ≤35 phr, preferably ≥20 phr to ≤30 phr, of polybutadiene rubber (BR);
- ≥0 phr to ≤20 phr, preferably ≥5 phr to ≤15 phr, of natural rubber (NR)

In another embodiment of the rubber composition according to the invention the aliphatic resin component has a molecular weight Mw of ≥800 to ≤2500 g/mol. Preferably the molecular weight Mw is ≥1000 to ≤2200 g/mol.

In another embodiment of the rubber composition according to the invention the aliphatic resin component comprises a polyterpene resin, C5 resin or DCPD resin, preferably a polyterpene resin or C5 resin. A preferred polyterpene resin has a Mw of ≥800 g/mol to ≤1200 g/mol. A preferred C5 resin has a Mw of ≥2000 to ≤2200 g/mol. A preferred polyterpene resin is a polylimonene resin.

In another embodiment of the rubber composition according to the invention the polybutadiene rubber component comprises a polybutadiene rubber which has been obtained under nickel or neodymium catalysis.

In another embodiment of the rubber composition according to the invention the polybutadiene rubber component comprises a polybutadiene rubber with a cis group content of ≥90%. Preferably the cis group content is ≥95%. The cis content of the polybutadiene rubber is usually provided by the supplier and is may be determined with FTIR. The method is based on the calculation of the ratio between the intensity of the bands attributable to the 1,4-trans and 1,2-vinyl isomers and a reference band (internal standard) falling at 1312 cm$^{-1}$ (L. J. Bellamy, The Infrared Spectra of Complex Molecules, Vol. 1 Third Edition, Chapman and Hall). The 1,4-cis content is determined by the difference from 100. Sample preparation is performed on a polybutadiene film, obtained by starting from a solution, evaporated on a KBr window.

In another embodiment of the rubber composition according to the invention the styrene-butadiene rubber component comprises a first styrene-butadiene rubber and a second styrene-butadiene rubber which is different from the first styrene-butadiene rubber.

Preferably the first styrene-butadiene rubber and second styrene-butadiene rubbers are both functionalised. Examples of functionalised styrene-butadiene rubbers are those comprising isocyanate groups, silanol groups, hydroxyl groups, silane-sulfide groups, amino groups and/or carboxylic anhydride groups.

It is also preferred that this rubber composition comprises ≥5 phr to ≤40 phr of the first styrene-butadiene rubber component, ≥20 phr to ≤60 phr of the second styrene-butadiene rubber component, ≥15 phr to ≤50 phr of the polybutadiene rubber component, ≥5 phr to ≤40 phr of the polyisoprene rubber and ≥10 phr to ≤30 phr of the aliphatic resin component. More preferred are ≥10 phr to ≤30 phr of the first styrene-butadiene rubber component, ≥30 phr to ≤50 phr of the second styrene-butadiene rubber component, ≥20 phr to ≤40 phr of the polybutadiene rubber component, ≥10 phr to ≤30 phr of the polyisoprene rubber and ≥15 phr to ≤25 phr of the aliphatic resin component.

It is also preferred that the rubber composition comprises a filler component. This filler can be carbon black, silica or a combination of both. The total amount of filler in the rubber composition is preferably ≥50 phr to ≤130 phr, more preferably ≥65 phr to ≤120 phr.

Another aspect of the present invention is a cross-linked rubber composition obtained by cross-linking the rubber composition according to the invention.

In one embodiment the cross-linked rubber composition has a tan delta at 0° C. of ≥0.3 to ≤0.4 (determined from DMA according to ISO 4664-1, frequency 10 Hz, 0.1% dynamic strain) and a tan delta at 70° C. of ≥0.10 to ≤0.25 (determined from DMA according to ISO 4664-1, frequency 10 Hz, 6% dynamic strain). Preferably the tan delta at 0° C. is ≥0.31 and the tan delta at 70° C. is ≥0.15 to ≤0.20.

In another embodiment the cross-linked rubber composition has a full width at half maximum (FWHM) (° C.) of ≥65° C. These values can be determined by recording a DMA according to ISO 4664-1, frequency 10 Hz, 0.1% dynamic strain, and calculating the full width at half maximum of the tan delta curve. Preferably this width is ≥65° C. to ≤90° C.

The present invention also relates to a method of preparing a tyre, comprising the steps of:
  providing a tyre assembly comprising a rubber composition according to the invention;
  cross-linking at least the rubber composition according to the invention in the tyre assembly.

The present invention also encompasses a tyre comprising a tyre tread, wherein the tyre tread comprises a cross-linked rubber composition according to the invention.

The present invention will be further described with reference to the following figures and examples without wishing to be limited by them.

Figure 1:
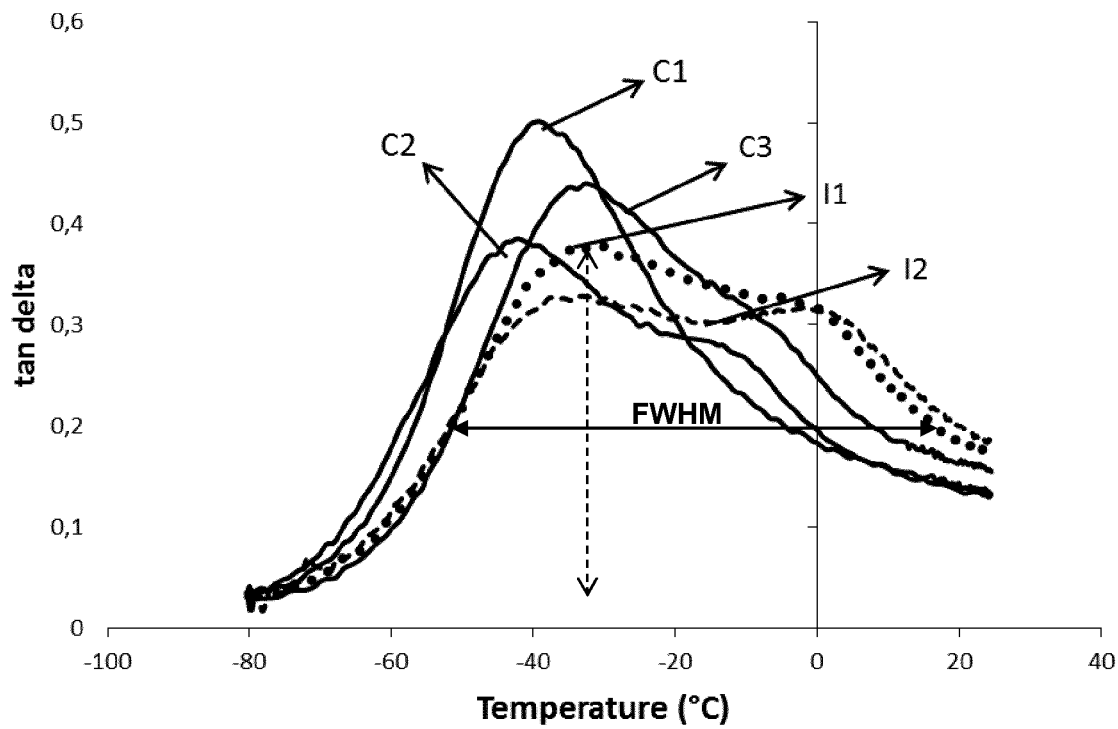
FIG. 1 shows temperature-dependent tan delta curves for examples C1, C2, C3, I1 and I2

To develop a tread compound with improved winter performance and wet grip, the compound is expected to perform well in wide range of temperatures. In this case, a compound which exhibits a broad tan delta curve (dynamic mechanical properties) is of great interest. Such a broad tan delta curve implies heterogeneity of the polymer network or polymer chains with wide distribution of segmental motions at different temperatures. As a measure for the broadness of the tan delta curve, the full width at half maximum (FWHM) of the tan delta curves was determined.

In order to develop a compound which can exhibit broad tan delta curve, a polyisoprene rubber with 3,4-linked isoprene units having a Tg of −10° C. has been added to the polymer blend to intentionally create immiscibility. As a result of this, dual tan delta peaks were obtained which resulted in slight broadening of the tan delta curve but there was no significant improvement in wet grip (tan delta at 0° C.).

In the next iteration, three different types of resin were added to the immiscible polymer blend in place of processing oil. Surprisingly, the aliphatic resins, polyterpene and C5, worked particularly well and broadened the tan delta curve. This is believed to be due to their preference to the phase comprising polyisoprene rubber. On the other hand, AMS resin did not help in broadening the tan delta curve indicating no preference to the phase comprising polyisoprene rubber.

Another approach of creating immiscible polymer blend has been attempted by introducing high styrene SSBR (SSBR III) possessing a Tg of −36° C. (40% styrene and 24% vinyl) to the polymer blend. In this case, dual tan delta peaks were obtained but there is no improvement in wet grip (tan delta at 0° C.). In a similar manner as for the other immiscible polymer blend, AMS and polyterpene resin were added. The addition of resins resulted only in the Tg shift but there was no observation of a broadening of the tan delta curve.

In accordance with the preceding, cross-linkable rubber compositions were prepared as described in the tables below. Compositions C1 to C6 are comparative examples and composition I1 and I2 are compositions according to the invention.

The polyisoprene rubber used was Isogrip of Karbochem, a solution-polymerised 3,4 addition polyisoprene with a $T_g$ of −10° C., a 3,4-addition product content of 60% and a viscosity (ML 1+4): of 65-70 M. U. according to its data sheet.

The polyterpene resin used was Sylvatraxx TR 7125 of Arizona Chemical, having a Mw of 1090 g/mol.

The C5 resin used was Piccotac 1098 of Eastman Chemical Company, having a Mw of 2150 g/mol.

The AMS (alpha methyl styrene) resin used was Sylvatraxx 4401 of Arizona Chemical, having a Mw of 1300 g/mol.

The SSBR I used was Sprintan SLR 4602 of Trinseo having a 21% styrene 50% vinyl content and a Tg of −25° C.

The SSBR II used was Sprintan SLR 3402 of Trinseo having a 15% styrene 30% vinyl content and a Tg of −62° C.

The SSBR III used was Sprintan SLR 6430 of Trinseo, an oil extended SSBR (27.27% of oil) with 40% styrene and 24% vinyl.

The butadiene rubber used was BUNA cis-132 of Trinseo having a Tg of −102° C.

The table below shows the compositions C1-6 and I1, I2:

|  | C1 | C2 | C3 | C4 | C5 | C6 | I1 | I2 |
|---|---|---|---|---|---|---|---|---|
| NR | 10.00 | 10.00 | 10.00 | 10.00 | 10.00 | 10.00 | 10.00 | 10.00 |
| Butadiene Rubber | 25.00 | 25.00 | 25.00 | 25.00 | 25.00 | 25.00 | 25.00 | 25.00 |
| SSBR I | 25.00 | 15.00 | 15.00 | 10.00 | 10.00 | 10.00 | 15.00 | 15.00 |
| SSBR II | 40.00 | 40.00 | 40.00 | 30.00 | 30.00 | 30.00 | 40.00 | 40.00 |
| polyisoprene rubber |  | 10.00 | 10.00 |  |  |  | 10.00 | 10.00 |
| SSBR III |  |  |  | 34.40 | 34.40 | 34.40 |  |  |
| TDAE (processing oil) | 39.00 | 39.00 | 20.00 | 30.00 | 10.00 | 10.00 | 20.00 | 20.00 |

-continued

|              | C1 | C2 | C3    | C4 | C5    | C6    | I1    | I2    |
|--------------|----|----|-------|----|-------|-------|-------|-------|
| AMS resin    |    |    | 20.00 |    | 20.00 |       |       |       |
| Polyterpene resin |    |    |       |    |       | 20.00 | 20.00 |       |
| C5 resin     |    |    |       |    |       |       |       | 20.00 |

All Amounts in Phr

In addition, all cross-linkable rubber compositions contained 2.00 phr ZnO, 1.00 phr stearic acid, 6 phr antioxidant and antiozonant, 8 phr processing promotor, 1.75 phr sulphur, 3.25 phr accelerator, 5.00 phr N 375 carbon black, 100.00 phr silica and 6.50 phr TESPD.

The cured rubbers derived from the aforementioned compositions had the mechanical properties outlined in the following table. DMA according to ISO 4664-1 tests were performed at −80° C. to 25° C. (dynamic strain 0.1% and frequency 10 Hz) and at 25° C. to 80° C. (dynamic strain 6% and frequency 10 Hz). Without wishing to be bound by theory it is believed that a higher tan delta value at 0° C. corresponds to better wet grip. Rebound testing at 70° C. (ISO 4662) is believed to be an indicator for rolling resistance. A higher rebound value at 70° C. relates to a lower rolling resistance for a tyre whose tread comprises such a cured rubber. Tensile testing was performed according to ISO 37.

Full width at half maximum was determined from the tan delta curve and taken as a measure for the broadness of the curve, and hence the ability of the compound to perform well at a high temperature interval.

extremely broad tan delta curve. Without being bound to theory it is believed that this is because of the enrichment of polyterpene resin in the polyisoprene rubber phase. As a result of this, tan delta at 0° C. is enormously increased indicating an increase in wet grip. In addition to that the FWHM is increased to 71, covering a temperature range of −52 to 19° C. A similar effect is observed for inventive example I2 with contains both polyisoprene rubber and C5 resin. Therefore, the inventive example offers an improvement in wet grip without losing on winter performance. Thus the trade-off between winter and wet is eliminated by creating a broad tan delta curve.

Figure 2:
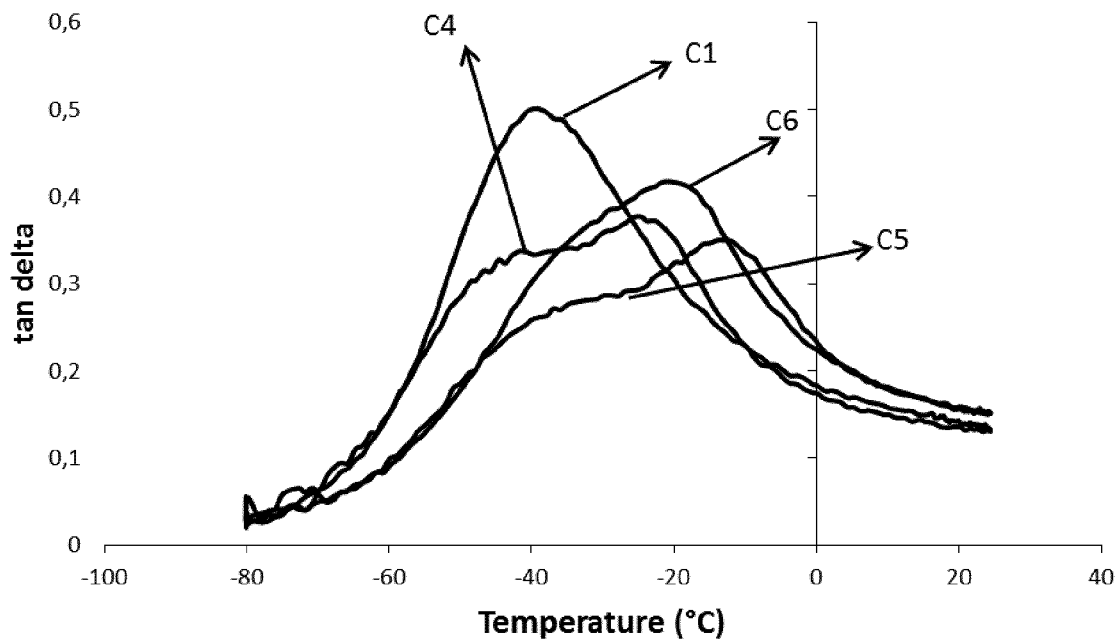
FIG. 2 shows temperature-dependent tan delta curves for examples C1, C4, C5 and C6

With respect to compositions C1 and C4 to C6, as shown in FIG. 2, the graphs for C4, C5 and C6 also display two peaks indicating incompatibility. In this case, incompatibility is achieved by using high styrene/low vinyl SSBR as seen in C4. Incorporating high Tg resins, both AMS and polyterpene caused only a shift in tan delta curve. There is no peak broadening effect.

Without being bound to theory, it is believed that the aliphatic resins (I1 and I2) have a good miscibility and a greater preference to the incompatible isoprene rubber than other polymers which is evident from the increased peak height in the temperature range of −10 to 10° C. compared to C2. The high preference of the aliphatic resins with the polyisoprene rubber might be related to the comparative chemical structure of the aliphatic resin and polyisoprene rubber. This resulted in broadening of the tan delta curve overall in the first set of inventive examples (I1 and I2). In the second set of examples (C5 and C6), the resin's prefer-

|                                   | C1       | C2      | C3      | C4      | C5      | C6      | I1       | I2       |
|-----------------------------------|----------|---------|---------|---------|---------|---------|----------|----------|
| Hardness (Sh A)                   | 62.20    | 62.5    | 63.8    | 64.2    | 64.8    | 64.8    | 62.3     | 63       |
| Elongation at break (%)           | 478.1    | 519.6   | 520.6   | 526     | 527.6   | 561.7   | 541.7    | 501.3    |
| M300% (MPa)                       | 8.87     | 8.29    | 9.22    | 8.96    | 8.54    | 7.89    | 8.72     | 8.59     |
| M300%/M100%                       | 4.27     | 3.66    | 4.03    | 4.11    | 3.97    | 4.00    | 3.78     | 3.84     |
| Tensile strength (MPa)            | 16.47    | 16.23   | 17.64   | 18.05   | 17.67   | 18.23   | 17.23    | 16.23    |
| Tear strength (MPa)               | 9.31     | 8.84    | 10.2    | 11.23   | 9.41    | 10.49   | 10.15    | 8.68     |
| Rebound 70° C. (%)                | 55.1     | 53.5    | 51.8    | 52.6    | 50.2    | 49.3    | 50.7     | 50.7     |
| Dynamic mechanical properties     |          |         |         |         |         |         |          |          |
| Tan delta at 0° C.                | 0.18     | 0.2     | 0.25    | 0.17    | 0.23    | 0.22    | 0.32     | 0.32     |
| Tan delta at 70° C.               | 0.16     | 0.18    | 0.18    | 0.18    | 0.19    | 0.19    | 0.18     | 0.18     |
| Full width at half maximum range (° C.) | −55 to −14 | −60 to 1 | −50 to 4 | −57 to −4 | −51 to 11 | −47 to 3 | −52 to 19 | −56 to 25 |
| Full width at half maximum (FWHM) (° C.) | 41       | 61      | 54      | 53      | 62      | 50      | 71       | 81       |

With respect to compositions C1 to C3 and I1 and I2, as shown in FIG. 1, the comparative example C2 displays two peaks indicating incompatibility, the first peak at −42° C. and the second peak at −10° C. being representative of 3,4 isoprene. It can be easily understood that the presence of 3,4 isoprene possessing Tg of −10° C. is incompatible to the other polymers in the recipe (NR, BR and SSBR). As a result of incompatibility, the tan delta curve is broadened compared to C1 and there is only a slight increase in the wet grip indicator (tan delta at 0° C.). Comparing C2 against C3, the comparative example C3 contains AMS resin which resulted only in shifting of the tan delta curve and there is no peak broadening effect.

The inventive example I1 which contains both polyisoprene rubber and polyterpene resin reveals a broad tan delta curve. Adding polyterpene resin in an incompatible polymer composition containing polyisoprene rubber leads to an ence and miscibility are most likely lacking with the incompatible SSBR rubber III, hence not resulting in a broadening of the tan delta curve.

Overall, among the comparative examples (C1 to C6), the inventive examples demonstrate improvement in wet grip without compromising on winter performance.

The invention claimed is:

1. A cross-linked rubber composition obtained by cross-linking a rubber composition comprising, per hundred parts by weight of rubber (phr):

≥1 phr to ≤99 phr of a rubber component selected from the group of styrene-butadiene rubber (SBR), polybutadiene rubber (BR), natural rubber (NR) or a mixture thereof; and ≥1 phr to ≤120 phr of an aliphatic resin component;

wherein the composition further comprises ≥1 phr to ≤50 phr of a polyisoprene rubber (IR) having ≥10 mol-%, as determined by NMR spectroscopy, of 3,4-linked units derived from isoprene; and wherein the cross-linked rubber composition has a tan delta at 0° C. of ≥0.3 to ≤0.4 (determined from DMA measurements according to ISO 4664-1, frequency 10 Hz, 0.1% dynamic strain) and a tan delta at 70° C. of ≥0.10 to ≤0.25 (determined from DMA measurements according to ISO 4664-1, frequency 10 Hz, 6% dynamic strain).

2. The cross-linked rubber composition according to claim 1, wherein its tan delta curve (determined from DMA measurements according to ISO 4664-1, frequency 10 Hz, 0.1% dynamic strain) has a full width at half maximum of ≥65° C.

3. The cross-linked rubber composition according to claim 1, wherein the polyisoprene rubber has a glass transition temperature of ≥−15° C. to ≤−5° C. (measured by DSC, according to ISO 22768).

4. The cross-linked rubber composition according to claim 1, wherein the polyisoprene rubber has a Mooney viscosity (ML 1+4, ASTM D1646-15) of ≥60 to ≤75 M. U.

5. The cross-linked rubber composition according to claim 1 wherein the composition comprises ≥5 phr to ≤40 phr of the polyisoprene rubber.

6. The cross-linked rubber composition according to claim 1, wherein the composition comprises ≥5 phr to ≤60 phr of the aliphatic resin component.

7. The cross-linked rubber composition according to claim 1, wherein the composition comprises ≥70 phr of rubbers with a glass transition temperature of ≥−120° C. to ≤−50° C. (measured by DSC, according to ISO 22768).

8. The cross-linked rubber composition according to claim 1, wherein the composition comprises:
≥45 phr to ≤65 phr of styrene-butadiene rubber (SBR);
≥15 phr to ≤35 phr of polybutadiene rubber (BR);
≥0 phr to ≤20 phr of natural rubber (NR).

9. The cross-linked rubber composition according to claim 1, wherein the aliphatic resin component has a molecular weight Mw of ≥800 to ≤2500 g/mol.

10. The cross-linked rubber composition according to claim 1, wherein the aliphatic resin component comprises a polyterpene resin, C5 resin or DCPD resin.

11. The cross-linked rubber composition according to claim 1, wherein the styrene-butadiene rubber component comprises a first styrene-butadiene rubber and a second styrene-butadiene rubber which is different from the first styrene-butadiene rubber.

12. A tyre comprising a tyre tread, wherein the tyre tread comprises a cross-linked rubber composition according to claim 1.

* * * * *